Nov. 9, 1926. Re. 16,461

M. C. A. LATOUR

AUDION OR LAMP RELAY OR AMPLIFYING APPARATUS

Original Filed July 2, 1918

Marius C. A. Latour
INVENTOR

BY
Prentiss, Davis, Marvin and Edmonds
ATTORNEYS

Reissued Nov. 9, 1926.

Re. 16,461

UNITED STATES PATENT OFFICE.

MARIUS C. A. LATOUR, OF SAN SEBASTIAN, SPAIN, ASSIGNOR TO LATOUR CORPORATION, OF JERSEY CITY, NEW JERSEY, A CORPORATION OF DELAWARE.

AUDION OR LAMP RELAY OR AMPLIFYING APPARATUS.

Original No. 1,584,701, dated May 11, 1926, Serial No. 243,080, filed July 2, 1918, and in France October 2, 1916. Application for reissue filed September 15, 1926. Serial No. 135,695.

(GRANTED UNDER THE PROVISIONS OF THE ACT OF MARCH 3, 1921, 41 STAT. L., 1313.)

This invention relates to an improvement in or modification of the invention described in my Patent No. 1,405,523, filed December 28, 1917.

In my patent above referred to the means of obviating undesirable noises in the amplifiers was indicated. Nevertheless in practice the number of successive amplifications that can be effected by connecting several audions or thermionic relays in cascade with transformers provided for frequencies of the same order of magnitude is limited. There comes a time when undesirable noises occur, in spite of the precautions taken.

The object of the present invention is to indicate a process enabling the number of successive amplifications that may be effected in practice to be increased, for the purpose of reception in wireless telegraphy. It consists in connecting first of all in cascade a certain number of audions or thermionic relays with a view to amplifying the high-frequency signal current by utilizing, as indicated in the main application, for example, transformers with magnetic circuits of iron constructed for high frequency. Then when the maximum number of high-frequency amplifications that can in this way be effected in practice has been reached, in detecting the high-frequency current by one of the known processes and in continuing then to amplify the signal by a series of audions or thermionic relays connected in cascade as described in the main application with transformers constructed for low frequency.

Figure 1:
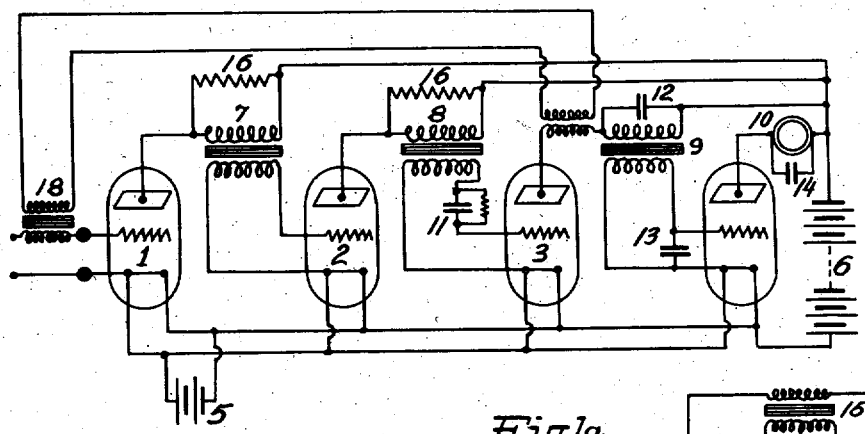
Figure 1A:
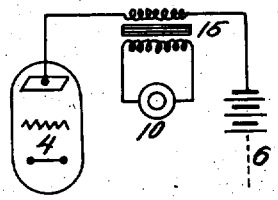
Figure 2:
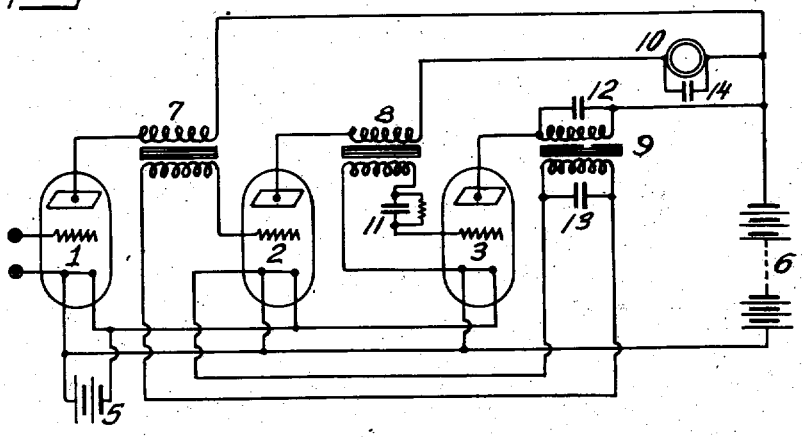

Figures 1 and 2 of the drawing accompanying the present specification illustrate diagrammatically the construction of the arrangements indicated above.

Figure 1[a] shows the connection of a special transformer for the telephone indicated in Figure 1.

In Figure 1 a similar combination is illustrated, having only four audions or thermionic relays 1, 2, 3, 4, hereinafter referred to as audions, the filaments of which are heated by the battery 5 and the plate circuits of which are supplied with current by one and the same source of continuous current 6.

The high-frequency current to be amplified is led to the grid and the negative pole of the filament of the audion 1. The high-frequency transformer 7 permits of a second high-frequency amplification by means of the audion 2, and the high-frequency transformer 8 enables the grid-filament circuit of the audion 3, which operates as a detector, to be supplied with current which is led to the positive terminal of the filament and to the grid through a small capacity 11 shunted by a high resistance.

The ratio of transformation of the transformer 8 is preferably made greater than unity.

The low-frequency transformer 9 provides for a low-frequency amplification stage by means of the audion 4, the plate-filament circuit of which supplies current to the telephone 10 either directly, as illustrated in the drawing, or by means of a special transformer 15, Fig. 1[a].

The introduction of a low-frequency amplification at the last stage allows of the stoppage of all high-frequency current which would otherwise reach the telephone headpiece and cause sustained oscillations. With the same object, i. e., the stoppage of all high-frequency current, capacities, 12, 13 and 14 are arranged as shunts to the primary of the low-frequency transformer, the secondary of this transformer, and the telephone headpiece, respectively.

These capacities provide a shunt path for the high-frequency currents without causing serious disturbances in the low-frequency amplification. The capacity 13 arranged between the grid and the filament of the audion 4 is particularly efficacious for the purpose of preventing oscillation. If high-frequency oscillation occurs for certain wave lengths a resistance 16 will be then connected in parallel either on the primary or the secondary of the high-frequency transformers in order to introduce the necessary damping. A coupling may be established between the plate circuit of the detector audion and the receiving circuit or any intermediate circuit of the series for the purpose of providing an arrangement which permits the heterodyne reception of continuous waves.

In particular, as shown in Figure 1, there may be connected between the grid and the filament of the first audion the secondary of a transformer 18 of which the primary is coupled with the plate circuit of the detector audion. Alternatively this primary coil could be coupled with the plate circuit of the preceding audion.

The inductance of the secondary of the transformer 18 will be such that it does not damp the reception to an appreciable extent. All the combinations that I have described may be provided in one and the same piece of apparatus, which occupies little space and does not necessitate any special regulation.

The same audions may be utilized, in a similar amplifier, for the amplification in certain high-frequency stages and in certain low-frequency stages. The accompanying Figure 2 shows the arrangement of such an amplifier, according to the present invention. In this figure the amplifier comprises three audions, 1, 2, 3, the filaments of which are heated by the battery 5 and the plate-filament circuits supplied with current by the common battery 6. The high-frequency current to be amplified is introduced between the grid and the filament of the audion 1. It is then introduced through the secondary of the transformer 7 into the audion 2, which amplifies it afresh, and it is finally conducted to the audion 3 through the transformer 8. The audion 3 plays the part of detector, and consequently detected current, that is to say low-frequency current, flows between its plate and its filament. This low-frequency current is transformed into the secondary the transformer 9 inserted between the grid and the filament of the audion 2, which amplifies the low-frequency current afresh. In this way the audion 2 amplifies first of all the high-frequency current, and then the low-frequency current which is ultimately heard in the telephone receiver 10. In order to shunt the high-frequency current around the windings of the low-frequency transformer 9, capacities 12 and 13 are connected across the terminals of these windings.

In a general way, as many stages of low-frequency amplification may be ultimately employed as there are stages of high-frequency amplification, but the first audion will be preferably reserved for the high-frequency working only.

What I claim as new, and desire to secure by Letters Patent of the United States, is:

1. In a high-frequency signaling system, the combination of a plurality of thermionic relays arranged in cascade and including a high-frequency amplifier relay, a low-frequency amplifier relay and an intermediate thermionic detector relay, means for coupling said relays comprising transformers coupling the output circuit of each of said relays to the input of the succeeding relay, a common source for supplying space current to all of said relays, a condenser shunting a winding of the transformer coupling said detector relay with said low-frequency amplifier relay whereby high-frequency current is diverted from said low-frequency relay and the tendency to the production of high-frequency oscillations through the use of said common source is reduced, and supplemental means for preventing high-frequency oscillations.

2. In a high-frequency signaling system, the combination of a plurality of thermionic relays arranged in cascade and including a thermionic detector relay following a thermionic amplifier relay, a common source for supplying space current to all of said relays, and means for coupling the output circuit of each of said relays to the input circuit of the succeeding relay, the input circuit of said detector relay at least being coupled directly to the output circuit of the preceding relay through a transformer having a core of magnetic material adapted to damp out high-frequency oscillations which tend to be produced through the use of said common source.

3. In a high-frequency signaling system, the combination of a plurality of thermionic relays arranged in cascade and including a high-frequency amplifier relay, a low-frequency amplifier relay, and an intermediate thermionic detector relay, a common source for supplying space current to all of said relays, and means for coupling the output circuit of each of said relays to the input circuit of the succeeding relay, the input circuit of said detector relay at least being coupled directly to the output circuit of the preceding relay through a transformer having a core of magnetic material adapted to damp out high-frequency oscillations which tend to be produced through the use of said common source.

4. In a high-frequency signaling system, the combination of a plurality of thermionic relays arranged in cascade and including a high-frequency amplifier relay, a low-frequency amplifier relay, and an intermediate thermionic detector relay, a common source for supplying space current to all of said relays, means for coupling the output circuit of each of said relays to the input circuit of the succeeding relay, and a capacity in shunt with the coupling means connected in the output circuit of said detector relay, whereby high-frequency current is diverted from said low-frequency relay and the tendency to the production of high-frequency oscillations through the use of said common source is reduced, the input circuit of said detector relay at least being coupled directly to the output circuit of the preceding relay through a transformer having a core of magnetic material adapted to effectually damp out high-frequency oscillations.

5. In a high-frequency signaling system, the combination of a plurality of thermionic relays arranged in cascade and including a thermionic detector relay following a thermionic amplifier relay, means for coupling the output circuit of each of said relays to the input circuit of the succeeding relay, and a transformer coupling the output circuit of the last of said relays to the input circuit of a preceding relay other than the first of the cascade, whereby incoming signals are passed a plurality of times through at least one of said relays, the input circuit of said detector relay at least being coupled directly to the output circuit of the preceding relay through a transformer having a core of magnetic material adapted to damp out high-frequency oscillations which tend to be produced through said coupling of the output of the last of said relays to the input circuit of a preceding relay.

6. In the reception of signals of high-frequency with a thermionic relay system including a plurality of cascaded thermionic relays depending on space current, a method which consists in amplifying current at high-frequency, then lowering the frequency, then amplifying anew the current at the lower frequency thus obtained, supplying space current to all of said relays from a common source, diverting high-frequency current from the low-frequency circuits, whereby the production of high-frequency oscillations through the use of said common source is reduced, and introducing reactions supplementing said diversion to effectually prevent high-frequency oscillations.

7. In the reception of signals of high-frequency with a thermionic relay system including a plurality of cascaded thermionic relays depending on space current, a method which consists in supplying space current to all of said relays from a common source, substantially aperiodically amplifying oscillations of high-frequency, said aperiodic amplification being adapted to damp out high-frequency oscillations which tend to be produced through the use of said common source, then lowering the frequency, and then amplifying anew the oscillations at the lower frequency thus obtained.

8. In the reception of high-frequency signals with a thermionic relay system including a plurality of cascaded thermionic relays depending on space current, a method which consists in passing the received high-frequency current through a plurality of thermionic amplifying relays to amplify such current at a first order of frequencies, then in lowering the frequency of such current to a second order of frequencies sufficiently removed from the received frequencies to permit ready separation of the two orders of frequencies, then in passing current of the second order of frequencies thus obtained again through one of said relays to obtain further amplification of such current at the second order of frequencies, supplying space current to all of said relays from a common source, and preventing high-frequency oscillations which tend to be produced through the use of said common source and through the use of one of said relays to amplify currents at two orders of frequency.

9. In the reception of high-frequency signals with a thermionic relay system including a plurality of cascaded thermionic relays depending on space current, a method which consists in passing the received high-frequency current through a plurality of thermionic relays to amplify such current at a first order of frequencies, then in lowering the frequencies of such current to a second order of frequencies sufficiently removed from the received frequencies to permit ready separation of the two orders of frequencies, then in passing current of the second order of frequencies thus obtained again through one of said relays other than the first of the cascade to obtain further amplification of such current at the second order of frequencies, supplying space current to all of said relays from a common source, and preventing high-frequency oscillations which tend to be produced through the use of said common source and through the use of one of said relays to amplify currents at two orders of frequencies.

10. In the reception of high-frequency signals with a thermionic relay system including a plurality of cascaded thermionic relays depending on space current, a method which consists in supplying space current to all of said relays from a common source, passing the received high-frequency current through a plurality of thermionic relays to substantially aperiodically amplify such current at a first order of frequencies, then in lowering the frequencies of such current to a second order of frequencies sufficiently removed from the received frequencies to permit ready separation of the two orders of frequencies, and then in passing current of the second order of frequencies thus obtained again through one of said relays other than the first of the cascade to obtain further amplification of such current at the second order of frequencies, said aperiodic amplification being adapted to damp out high frequency oscillations which tend to be produced through the use of said common source and through the use of one of said relays to amplify current at two orders of frequencies.

11. In a system consisting of a plurality of thermionic relays of the audion type arranged in cascade, the method of receiving radio signals and of obtaining a higher degree of amplification of such signals than is possible with amplification at frequencies of one order of magnitude only, with a minimum of current sources for said relays, and without the occurrence of disturbing noises, which comprises introducing reactions opposing the production of disturbing high-frequency oscillations in the system, successively amplifying the signal current at high frequency to a higher degree than would be possible without the production of oscillations in the absence of said opposing reactions, detecting the amplified high-frequency signal current, amplifying the detected signal current at low frequency, supplying space current to all of said relays from a common source, diverting high-frequency current from the low-frequency circuits, whereby the production of high-frequency oscillations through the use of said common source is substantially prevented, and translating the amplified low-frequency current into sound waves.

12. In a system consisting of a plurality of thermionic relays of the audion type arranged in cascade, the method of receiving radio signals and of obtaining a higher degree of amplification of such signals than is possible with amplification at frequencies of one order of magnitude only, without the occurrence of disturbing noises, which comprises introducing reactions opposing the production of disturbing high-frequency oscillations in the system, successively amplifying the signal current at high frequency to the highest degree possible without the production of oscillations which tend to be produced in spite of the introduction of said opposing reactions, detecting the amplified high-frequency signal current, amplifying the detected signal current at low frequency, and translating the amplified low-frequency current into sound waves.

13. In a system consisting of a plurality of thermionic relays of the audion type arranged in cascade, the method of receiving radio signals and of obtaining a higher degree of amplification of such signals than is possible with amplification at frequencies of one order of magnitude only, without the occurrence of disturbing noises, which comprises introducing reactions opposing the production of disturbing high-frequency oscillations in the system, successively amplifying the signal current at high frequency to a higher degree than would be possible without the production of oscillations in the absence of said opposing reactions, detecting the amplified high-frequency signal current, introducing reactions opposing the production of disturbances at low frequency, successively amplifying the detected signal current at low frequency to a higher degree than would be possible without the introduction of said reactions opposing low-frequency disturbances, and translating the amplified low-frequency current into sound waves.

14. In a system consisting of a plurality of thermionic relays of the audion type arranged in cascade, the method of receiving radio signals and of obtaining a higher degree of amplification of such signals than is possible with amplification at frequencies of one order of magnitude only, without the occurrence of disturbing noises, which comprises introducing reactions opposing the production of disturbing high-frequency oscillations in the system, successively amplifying the signal current at high frequency to the highest degree possible without the production of oscillations which tend to be produced in spite of the introduction of said opposing reactions, detecting the amplified high-frequency signal current, introducing reactions opposing the production of disturbances at low frequency, successively amplifying the detected signal current at low frequency to a higher degree than would be possible without the introduction of said reactions opposing low-frequency disturbances, preventing high-frequency current from affecting the low-frequency amplifying step, and translating the amplified low-frequency current into sound waves.

15. In a system consisting of a plurality of thermionic relays of the audion type arranged in cascade, the method of receiving radio signals and of obtaining a higher degree of amplification of such signals than is possible with amplification at frequencies of one order of magnitude only, without the occurrence of disturbing noises, which comprises introducing damping to prevent disturbing high-frequency oscillations in the system, successively amplifying the signal current at high frequency to a higher degree than would be possible without the production of oscillations in the absence of said damping, detecting the amplified high-frequency signal current, amplifying the detected signal current at low frequency, preventing high-frequency current from affecting the low-frequency amplifying step, and translating the amplified low-frequency current into sound waves.

16. A thermionic relay system for receiving radio signals wherein a higher degree of amplification of such signals is obtained than is possible with amplification at frequencies of one order of magnitude only, without the occurrence of disturbing noises, comprising a plurality of transformer-coupled thermionic relays of the audion type in cascade circuit arrangement, means for introducing reactions opposing the production of disturbing high-frequency oscillations in the system, means including a certain plurality of said circuits, transformers and relays for successively amplifying the signal current at high frequency to the highest degree possible without the production of disturbing oscillations which tend to be produced in spite of said means introducing reactions, means including one of said relays with its circuits for detecting the amplified signal current, means opposing the production of disturbances at low frequency in the system, means including a certain plurality of said relays, transformers and circuits for successively amplifying the detected signal current at low frequency to a higher degree than would be possible without said means opposing the production of low-frequency disturbances, means for preventing high-frequency signal current from passing through said last-mentioned transformers, and means for translating the amplified low-frequency signal current into sound waves.

17. A thermionic relay system for receiving radio signals wherein a higher degree of amplification of such signals is obtained than is possible with amplification at frequencies of one order of magnitude only, without the occurrence of disturbing noises, comprising a plurality of transformer-coupled thermionic relays of the audion type in cascade circuit arrangement, means including said transformers for introducing reactions opposing the production of disturbing high-frequency oscillations in the system, means including a certain plurality of said circuits, transformers and relays for successively amplifying the signal current at high frequency to the highest degree possible without the production of disturbing oscillations which tend to be produced in spite of said means introducing reactions, means including one of said relays with its circuits for detecting the amplified signal current, means including certain of said transformers for preventing disturbances at low frequency in the system, means including a certain plurality of said relays, transformers and circuits for successively amplifying the detected signal current at low frequency, means associated with certain of said last-mentioned transformers for preventing high-frequency signal current from passing therethrough, and means for translating the amplified low-frequency signal current into sound waves.

18. A thermionic relay system for receiving radio signals wherein a higher degree of amplification of such signals is obtained than is possible with amplification at frequencies of one order of magnitude only, without the occurrence of disturbing noises, comprising a plurality of transformer-coupled thermionic relays of the audion type in cascade circuit arrangement, resistance damping means associated with certain of said transformers for introducing reactions opposing the production of disturbing high-frequency oscillations in the system, means including a certain plurality of said circuits, transformers and relays for successively amplifying the signal current at high frequency to the highest degree possible without the production of disturbing oscillations which tend to be produced in spite of said means introducing opposing reactions, means including one of said relays with its circuits for detecting the amplified signal current, a thermionic relay for amplifying the detected signal current at low frequency, and means for translating the amplified low-frequency signal current into sound waves.

MARIUS C. A. LATOUR.